US007020894B1

(12) United States Patent
Godwin et al.

(10) Patent No.: US 7,020,894 B1
(45) Date of Patent: Mar. 28, 2006

(54) VIDEO AND AUDIO SYNCHRONIZATION

(75) Inventors: Russell Mark Godwin, North Weald (GB); John Michael Wilson, Leeds (GB)

(73) Assignee: Leeds Technologies Limited, Yorkshire (GB)

( * ) Notice: Subject to any disclaimer, the term of this patent is extended or adjusted under 35 U.S.C. 154(b) by 0 days.

(21) Appl. No.: 09/744,374

(22) PCT Filed: Jul. 16, 1999

(86) PCT No.: PCT/GB99/02300

§ 371 (c)(1),
(2), (4) Date: Mar. 6, 2001

(87) PCT Pub. No.: WO00/05901

PCT Pub. Date: Feb. 3, 2000

(30) Foreign Application Priority Data

Jul. 24, 1998 (GB) .................................... 9816135
Mar. 12, 1999 (GB) .................................... 9905659

(51) Int. Cl.
*H04N 7/16* (2006.01)
*H04N 9/475* (2006.01)
*H04N 17/00* (2006.01)
*H04N 17/02* (2006.01)

(52) U.S. Cl. ...................... 725/135; 348/515; 348/518; 348/180; 348/192

(58) Field of Classification Search ................ 348/180, 348/192, 194, 515, 518; 725/135
See application file for complete search history.

(56) References Cited

U.S. PATENT DOCUMENTS 4,689,676 A * 8/1987 Nakajima et al. ........... 348/513
4,703,355 A * 10/1987 Cooper ....................... 348/518
4,963,967 A * 10/1990 Orland et al. ............... 348/515
RE33,535 E * 2/1991 Cooper ....................... 348/518
5,550,594 A * 8/1996 Cooper et al. ............. 348/513

FOREIGN PATENT DOCUMENTS

EP 0 386 928 9/1990
GB 2 282 929 4/1995

OTHER PUBLICATIONS

Patent Abstracts of Japan, vol. 012, No. 153 (E-607), May 11, 1988.

* cited by examiner

*Primary Examiner*—John Miller
*Assistant Examiner*—Michael W. Hoye
(74) *Attorney, Agent, or Firm*—Smith-Hill and Bedell

(57) ABSTRACT

In order to synchronise video and audio signals, a video test signal and an audio test signal are generated at the transmitting end of a transmission link, and transmitted over the link. The video test signal has first and second active picture periods of contrasting states. The audio test signal has first and second periods of contrasting states. As generated, the video and audio test signals have a predetermined timing relationship—for example, their changes of respective states may be coincident in time. At the receiving end of the link, the video and audio test signals as received are detected, and any difference of timing between the video and audio test signals is derived from their changes of respective states, measured and displayed, including an indication of whether the video signal arrived before the audio signal or vice-versa. Additionally or alternatively, such a measurement signal can be used in a control loop to compensate for the delay and automatically re-synchronise the audio and video signals. The system is particularly suitable for transmission of video and audio over separate paths of a link—e.g. respectively over satellite and terrestrial paths.

16 Claims, 4 Drawing Sheets

NOT TO SCALE

VIDEO AND AUDIO SYNCHRONIZATION

This invention relates to video and audio synchronisation.

For a number of years, there has been difficulty in subjectively determining the correct relationship between television broadcast sound and vision timings. This is true not only for television broadcasts but for the transmission of audio and video signals generally. With a variety of transmission mediums available for the distribution of video and audio signals, where paths differ it is perfectly feasible that they may arrive up to several seconds displaced from one another. Even a small difference of 20–40 mS of differential vision/sound delay can introduce an objectionable "lip sync" error.

The advent of digital transmission systems has compounded the problem, such that synchronisation errors are now observed even where the video and audio are transmitted on the same path, through the same medium. This is a result of transmission specifications being sufficiently wide to allow errors of 60 mS within a single satellite path, which may be additive or subtractive where multiple satellite links are used. Differential delay may also be introduced within the studio environment, when the video is processed by digital effects equipment, causing the signal to be late compared to the audio signal, which is not so processed.

There is already equipment in use that can correct this delay. However it relies totally on an operator's skill in subjectively estimating the degree of error between the video and audio signal, in order to introduce the required level of compensating delay to the audio path to achieve synchronisation. This subjective method involves someone "clapping" in vision or attempting to match pictures to sound by watching lips moving. It is at best a very inaccurate and time consuming method, which is open to dispute as to what is "right".

Preferred embodiments of the present invention aim to provide synchronisation systems which may be improved in the foregoing respects.

According to one aspect of the present invention, there is provided a system for synchronizing video and audio signals transmitted over a link between a first point and a second point, the system comprising:

a. for use at said first point:

i. video generating means for generating a video test signal having a first active picture period of a first state and a second active picture period of a second state which contrasts with said first state;

ii. audio generating means for generating an audio test signal having a first period of a first state and a second period of a second state which contrasts with said first state, said second periods of said audio and video test signals having a predetermined time relationship such that each said second period of said audio test signal is associated with a respective said second period of said video test signal, to make a respective pair of associated video and audio signals;

iii. video output means for outputting over said link a video output signal comprising said video test signal; and iv. audio output means for outputting over said link an audio output signal comprising said audio test signal: and b. for use at said second point:

i. video input means for receiving said video output signal output over said link by said video output means;

ii. audio input means for receiving said audio output signal output over said link by said audio output means;

iii. a video timing signal generator arranged to receive from said video input means said received video output signal and generate therefrom gating signals which represent active picture periods in said received video output signal;

iv. video detection means for receiving said received video output signal, detecting when said video test signal in said received video output signal changes to said second state, and outputting a video timing signal when said video test signal in said received video output signal changes to said second state;

v. audio detection means for receiving said received audio output signal, detecting when said audio test signal in said received audio output signal changes to said second state, and outputting an audio timing signal when said audio test signal in said received audio output signal changes to said second state, such that each said audio timing signal is associated with the video timing signal of its respective pair;

vi. gating means arranged to receive said gating signals and said video and audio timing signals and to pass said video and audio timing signals only during active picture periods in said received video output signal, as indicated by said gating signals; and vii. timing measurement means for receiving said video and audio timing signals passed by said gating means, detecting whether there has been any change in said predetermined time relationship between each pair of said video and audio timing signals, detecting whether said video timing signal or said audio timing signal of each associated pair has been delayed with respect to the other, measuring any such delay, providing a measurement signal representative of any such delay, and providing an indication signal representative of whether an audio timing signal has been delayed with respect to the video timing signal of its respective pair or vice-versa.

Said second periods may be substantially coincident in time.

Said second periods may be a predetermined time apart.

Said first point may be at a transmitter, said second point at a receiver, and said link a transmission link between said transmitter and receiver.

Said transmission link may include a satellite transmission path.

Said transmission link may include a satellite path for video signals and a terrestrial path for corresponding audio signals.

Said first point may be at a transmitter or transmission distribution point, and said second point at a domestic receiver.

Said first point may be upstream of a video processing apparatus and said second point downstream of said video processing apparatus.

Said video processing apparatus may comprise a video effects generator.

Said first and second states of said video test signal may be represented by contrasting voltage levels.

Said first and second states of said audio test signal may be represented by contrasting voltage levels.

Said video and audio output signals may be transmitted over said link in digital form.

One or both of said video and audio signals may be transmitted as part of a multiplexed signal.

Transmission of said signals over said link may be by way of a plurality of different carrier signals.

Said link may comprise a data link for the transmission of video, audio and data signals.

The invention extends to apparatus for use in a system for synchronizing video and audio signals transmitted over a link between a first point and a second point, the apparatus being as specified in any of the preceding aspects of the invention, for use at said second point.

According to a further aspect of the present invention, there is provided a method of synchronizing video and audio signals transmitted over a link between a first point and a second point, the method comprising the steps of:

a. at said first point:
   i. generating a video test signal having a first active picture period of a first state and a second active picture period of a second state which contrasts with said first state;
   ii. generating an audio test signal having a first period of a first state and a second period of a second state which contrasts with said first state, said second periods of said audio and video test signals having a predetermined time relationship such that each said second period of said audio test signal is associated with a respective said second period of said video test signal, to make a respective pair of associated video and audio signals;
   iii. outputting over said link a video output signal comprising said video test signal; and
   iv. outputting over said link an audio output signal comprising said audio test signal: and
b. at said second point:
i. receiving said video output signal output over said link by said video output means;
ii. receiving said audio output signal output over said link by said audio output means;
iii. generating from said received video output signal and gating signals which represent active picture periods in said received video output signal;
iv. detecting when said video test signal in said received video output signal changes to said second state, and outputting a video timing signal when said video test signal in said received video output signal changes to said second state;
v. detecting when said audio test signal in said received audio output signal changes to said second state, and outputting an audio timing signal when said audio test signal in said received audio output signal changes to said second state, such that each said audio timing signal is associated with the video timing signal of its respective pair;
vi. receiving said gating signals and gating said video and audio timing signals to pass said video and audio timing signals only during active picture periods in said received video output signal, as indicated by said gating signals; and
vii. detecting in said video and audio timing signals passed by said gating means, whether there has been any change in said predetermined time relationship between each pair of said video and audio timing signals, detecting whether said video timing signal or said audio timing signal of each associated pair has been delayed with respect to the other, measuring any such delay, providing a measurement signal representative of any such delay, and providing an indication signal representative of whether an audio timing signal has been delayed with respect to the video timing signal of its respective pair or vice-versa.

Such a method may be carried out by means of a system or apparatus according to any of the preceding aspects of the invention.

For a better understanding of the invention, and to show how embodiments of the same may be carried into effect, reference will now be made, by way of example, to the accompanying diagrammatic drawings, in which.

Figure 1:
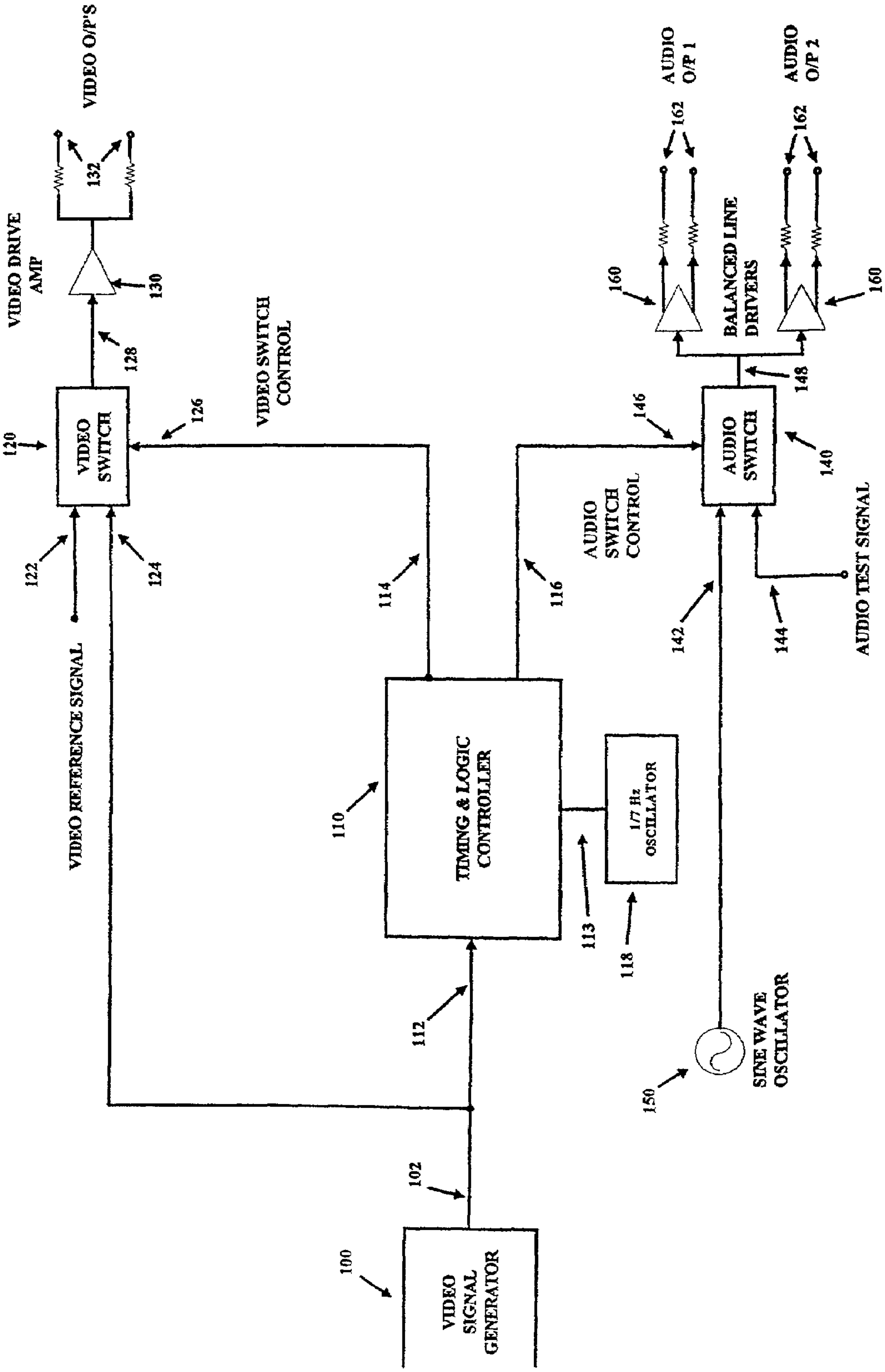
FIG. 1 is a block schematic diagram of one example of apparatus in accordance with an embodiment of the invention, for use at the transmitting side of a transmission link.
Figure 2:
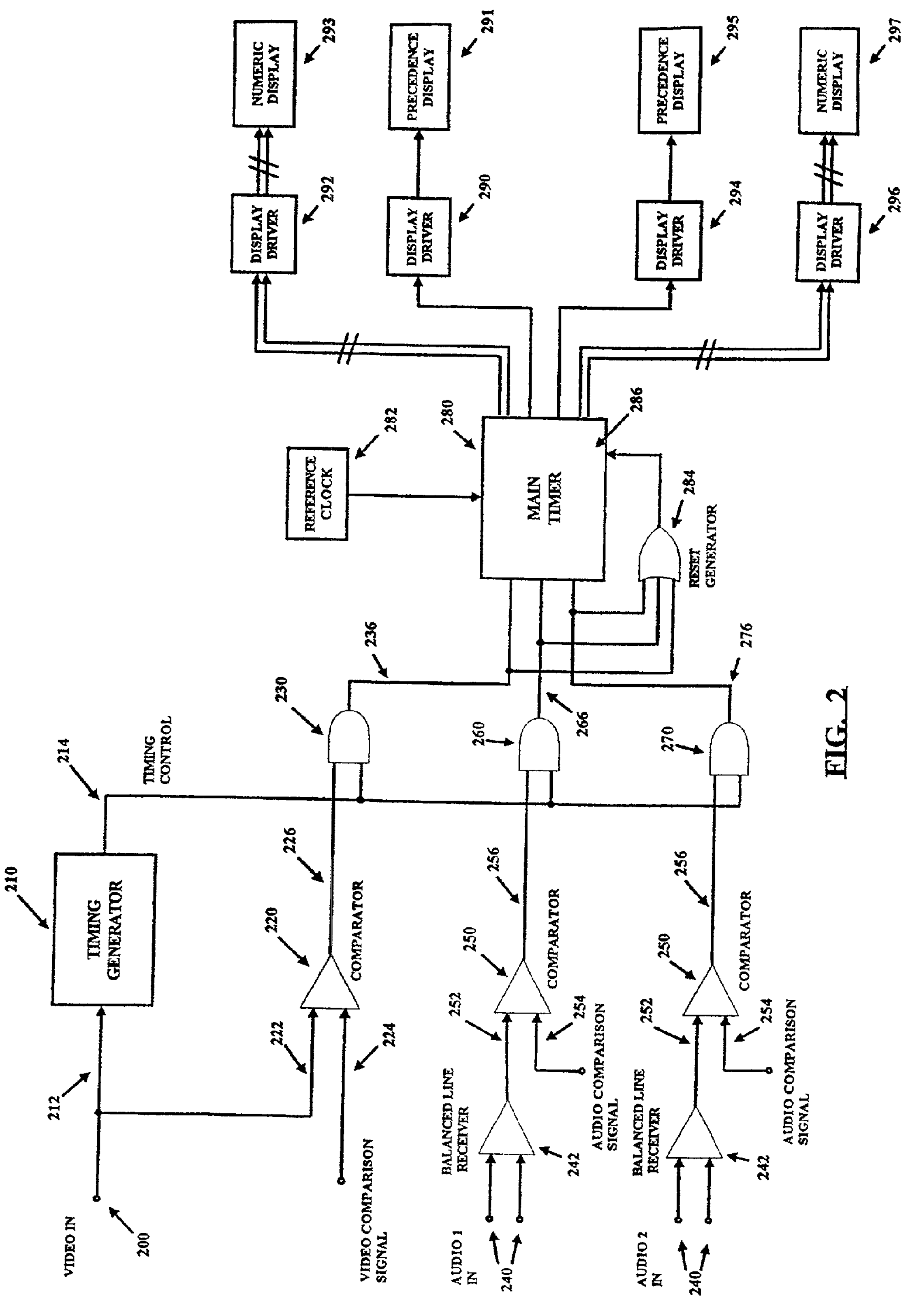
FIG. 2 is a block schematic diagram of one example of apparatus in accordance with an embodiment of the invention, for use at the receiving side of a transmission link.

The apparatus shown in FIGS. 1 and 2 comprises a system for synchronising video and audio signals in a television broadcast signal which is transmitted over a transmission link. For example, the transmission link may comprise a satellite path over which the video signal is transmitted and a terrestrial path (e.g. an ISDN communications line) over which the audio signal is transmitted. Because the video and audio signals are transmitted over different paths, there is every possibility that, when the final television broadcasting signal is displayed at the receiving end, there is a distinct time difference and therefore lack of synchronisation between the video and audio signals. As has been mentioned above, this can be due in part to the difference in transmission characteristics of the two different transmission paths. It can also be due in part to the different signal processing techniques to which the video and audio signals are respectively subjected. This is particularly the case with digital signals, which will typically be subjected to various compression techniques, for transmission or other processing.

In order to synchronise the video and audio signals, a video test signal and an audio test signal are generated at the transmitting end, and transmitted over the transmission link. As generated, the video and audio test signals have a predetermined timing relationship and, in this particular example, are coincident in time. At the receiving end, the video and audio test signals as received are detected, and any difference of timing between the video and audio test signals is measured and displayed. Additionally or alternatively, such a measurement signal can be used in a control loop to compensate for the delay and automatically re-synchronise the audio and video signals.

The apparatus that is shown in FIG. 1 will be conveniently referred to as the "transmitting apparatus" 1, and comprises a video signal generator 100 which is arranged to output a composite video signal of black level at an output 102. The video signal of black level is fed to one input 124 of a video switch 120, and to an input 112 of a timing and logic controller 110.

A further input 113 of the controller 110 also receives an output from an oscillator 118 of frequency 1/7 Hz. The controller 110 has a first output 114 connected to a control terminal 126 of the video switch 120. It also has a second output 116 connected to a control terminal 146 of an audio switch 140.

The video switch 120 receives on another input 122 a reference signal which, in this example, is peak white level of substantially 0.7 volts with respect to black level. The video switch 120 is operative to switch between its two inputs 122 and 124, under control of the timing and logic controller 110, in order to provide at the output 128 of the video switch 120 a video test signal which comprises 40 mS pulses of peak white produced at intervals of 7 seconds on an otherwise black signal. To this end, the controller 110 detects the field and line synchronisation information in the signal from the generator 100, and controls operation of the video switch 120 accordingly to ensure that each of the 40 mS pulses of peak white occupies only active picture periods.

The video test signal is fed to a video drive amplifier 130 which subsequently provides two standard 75 ohms video outputs 132. One of the video output signals produced at the output 132 is then transmitted over the transmission link, and the other may be used for monitoring at the transmitter end, or for synchronisation of another transmission link.

The audio switch 140 has a first input 142 which is connected to receive the output of a sinewave oscillator 150 which produces, for example, a signal of frequency 6 kHz at a level of about 1 volt peak-to-peak. On another input 144, the audio switch 140 receives an audio test signal which, in this example, is 0 volts or another d.c. level, corresponding to silence.

The audio switch 140 switches between the two signals at its inputs 142 and 144, under the control of the timing and logic controller 110, to produce at its output 148 an audio test signal which is fed to a pair of output amplifiers 160, each feeding a respective 600 ohms balanced audio line to provide an audio output signal at outputs 162. In this example, there are two audio channels through respective output amplifiers 160, in order to process dual audio signals. The dual audio signals may be separate audio signals—for example, transmitted over different paths—or the left and right channels of a stereo audio signal. For a mono signal, one of the channels can be dispensed with. On the other hand, as many audio channels as desired may be provided.

Figure 3:
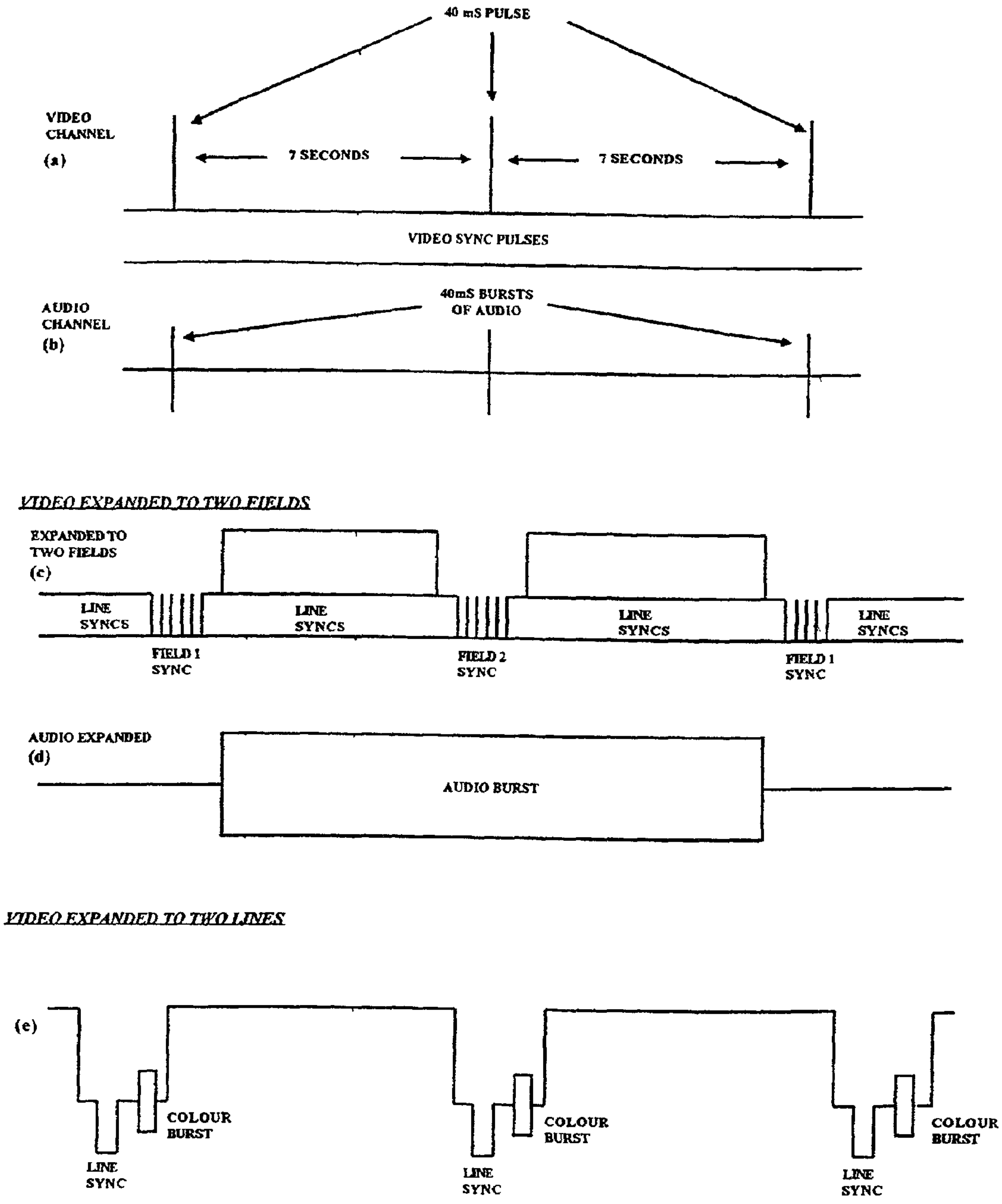
FIG. 3 is a waveform diagram showing examples of waveforms in use of the embodiments shown in FIGS. 1 and 2.

Referring now to FIG. 3, examples of video and audio waveforms produced by the transmitting apparatus 1 are illustrated.

Waveform (a) denotes 40 mS pulses of peak white produced at intervals of 7 seconds on an otherwise black signal. The various video sync pulses are not shown in detail in waveform (a), due to the scale of the diagram.

Waveform (b) shows the equivalent audio signal, similarly having 40 mS bursts of audio signal at frequency 6 kHz at intervals of 7 seconds, in an otherwise silent audio signal. The 40 mS bursts of audio coincide exactly in time with the 40 mS pulses of peak white video.

Waveform (c) shows one of the 40 mS pulses of waveform (a) to a larger scale. As may be seen, each 40 mS pulse occupies two full fields.

Waveform (d) shows the 40 mS audio burst to the same scale as waveform (c). In particular, it may be seen that the audio burst coincides exactly in time with the 40 mS video pulse.

In waveform (e), part of the 40 mS video pulse is shown to a yet larger scale, in two successive lines of one of the respective fields.

It is important to appreciate that, as shown in FIG. 3, each 40 mS pulse of peak white occupies only active picture periods. In particular, the video sync pulses, including the field and line sync pulses, are left untouched by the 40 mS pulses, as is the colour burst. The peak white level is applied only to the active picture period of each of the respective lines, under control of the controller 110.

The significance of this is that, in many modern digital compression techniques, much of the original video signal is discarded. In particular, all synchronising pulses will typically be lost. Thus, since each 40 mS pulse of peak white in this embodiment of the invention is transmitted only during active picture periods, there is no danger of the peak white signal being lost due to digital compression techniques.

It should also be noted that, as will be understood by those skilled in the art, because each nominally 40 mS pulse of peak white is only in active picture periods, the pulse is not at 0.7 volts above black level for a full 40 mS. It switches rapidly between black level and its 0.7 volts level for each line of active picture period, as may be seen in FIG. 3, to leave all of the synchronising pulses unaffected. Thus, the period from the leading edge of the first peak white level field period to the trailing edge of the second such period, as shown in FIG. 3, is slightly less than 40 mS, and the audio burst is drawn correspondingly in FIG. 3 (*d*) as having exactly the same duration. However, those skilled in the art will understand the overall peak white level pulse to be a 40 mS pulse, as it occupies two full fields, and such terminology is used conveniently in this specification.

If desired, the audio burst could have a full 40 mS duration, and this is a convenient way to generate it, such that it lasts from the first synchronising pulse of one field to the first synchronising pulse of the next field but one. Since (as will now be described below), the apparatus at the receiving end effectively ignores all signals outside active picture periods for the calculation of synchronisation errors, the slightly longer duration of the audio pulse, at a full 40 mS, is automatically taken into account.

The apparatus that is shown in FIG. 2 for use at the receiving end will conveniently be referred to as the "receiving apparatus" 2.

A standard 75 ohm video input 200 receives the video output signal that has been transmitted by the transmitting apparatus 1 over the transmission link. The received video signal is fed to an input 212 of a timing generator 210, and also to a first input 222 of a comparator 220.

The timing generator 210 detects from the received video signal field and line blanking information, and generates a special timing signal comprising a series of pulses, each corresponding to an active picture period of a respective line. Thus, each pulse serves as a gating signal to enable subsequent circuitry only during active picture periods. The gating signals output from the timing generator 210 are passed to respective inputs of logic AND-gates 230, 260 and 270.

The comparator 220 has a second input 224 which receives a video comparison signal which, in this example, is a constant d.c. voltage of 0.5 volts with respect to black level. The comparator 220 is operative to detect when the signal at input 222 exceeds 0.5 volts with respect to black level and produce a corresponding video timing signal at output 226, which is connected to a second input of the AND-gate 230.

Thus, the comparator 220 is operative to detect when the level in the video test signal as received changes from black to peak white level, since the level at input 222 then exceeds that at the input 224. A corresponding pulse is produced at the output of comparator 220, and this pulse is passed to the output 236 of the AND-gate 230, only when the other input of the AND-gate 230 is enabled by a respective gating signal from the timing generator 210. In other words, a pulse is produced at the output 236 only when the comparator 220 detects an appropriate level change at its input 222, and only during an active picture period.

In a similar way, there are provided a pair of audio inputs 240, each to receive a respective channel of the dual audio signals transmitted over the transmission link.

Each audio input 240 provides a balanced 600 ohm input via a receiving amplifier 242, the output of which is connected to one input 252 of a comparator 250. Another input 254 of the comparator 250 is connected to receive an audio comparison signal which, in this example, may be for example a d.c. level of 0.5 volts with respect to black level. The output 256 of the comparator 250 is fed to a respective AND-gate 260 for one of the dual audio channels and 270 for the other of the dual audio channels, each of the AND-gates 260, 270 being gated by the gating signals received from the timing generator 210.

Thus, in use, each comparator 250 detects a respective burst of 6 kHz in the received audio signal, the level of the burst exceeding that of the audio comparison signal, and a corresponding detection signal is produced at the output 256 of the comparator 250. That output signal is passed by the respective AND-gate 260 or 270 only during active picture periods, due to the enabling gating signals from the timing generator 210.

The outputs 236, 266 and 276 of the AND-gates 230, 260 and 270 are connected to respective inputs of a main timer 280. A reference clock 282 provides accurate clock pulses to the main timer 280, and for this purpose, a frequency of 1 kHz to give a series of 1 mS pulses has been found to provide excellent accuracy for the purpose of this embodiment of the invention.

Following a previous reset, the main timer 280 detects a first pulse to be received from any of the three outputs 236, 266 and 276. Upon receipt of that first pulse, the main timer 280 sets a flag to note which signal has arrived first and a first timing period is started. Upon receipt of the next pulse from the remaining two outputs, another flag is set to note which signal has been received and a second timing period is started. Upon receipt of a pulse from the final AND-gate output, the timing periods are stopped.

The AND-gate outputs 236, 266 and 276 are connected also to respective inputs of an OR-gate 284 which passes to a reset circuit 286 of the main timer 280 all pulses received from the AND-gates 230, 260 and 270. After a predetermined period during which no pulses are received by the reset circuit 286, the reset circuit 286 emits a reset pulse to the main timer 280, in response to which the flags and timing periods of the main timer 280 are reset to await the start of another timing sequence. However, respective output signals of the main timer 280 remain latched.

In this example, the above-mentioned predetermined period is 3.49 seconds, representing a 3.49 second period of video black level and audio silence, which is taken to indicate that the last set of associated video and audio timing signals has ceased, and that the next timing signals to be received after this period are a new set of associated signals. The period of 3.49 seconds (and the basic 7 second period of transmitted pulses) can be adjusted to reflect the maximum delay that can be expected in a particular situation.

In this example, the output signals from the main timer 280 are used for display drivers and displays 290–297.

The first display driver 290 drives a display 291 to indicate which of the video signal and audio signal 1 is the first to be received, as detected by the main timer 280. A second display driver 292 drives a corresponding display 293 to indicate the delay, typically in mS, between the video signal and audio signal 1, as detected by the main timer 280.

A third display driver 294 drives a corresponding display 295 to indicate which of the video signal and audio signal 2 is the first to be received, and a fourth display driver 296 drives a corresponding display 297 to indicate, typically in mS, the delay between the video signal and audio signal 2.

Thus, in this way, the illustrated system may be operative readily to indicate the order in which the three signals of the television broadcast signal arrive and the delay between the respective signals, those signals comprising a video signal and two audio signals. It will be appreciated that the displays may be arranged to display this data in any desired order or manner.

A particularly important feature of the illustrated embodiment of the invention is that it is operative to measure and indicate delays as well as order of receipt of signals, irrespective of whether video arrives before or after either one or both of the audio signals.

In addition to or as an alternative to displaying the measurement results and/or order of receipt of signals, output signals from the main timer 280 may readily be used to control delay circuits in any or all of the video and audio paths, in order that accurate synchronisation of the video and audio signals may be restored at the receiving end.

Figure 4:
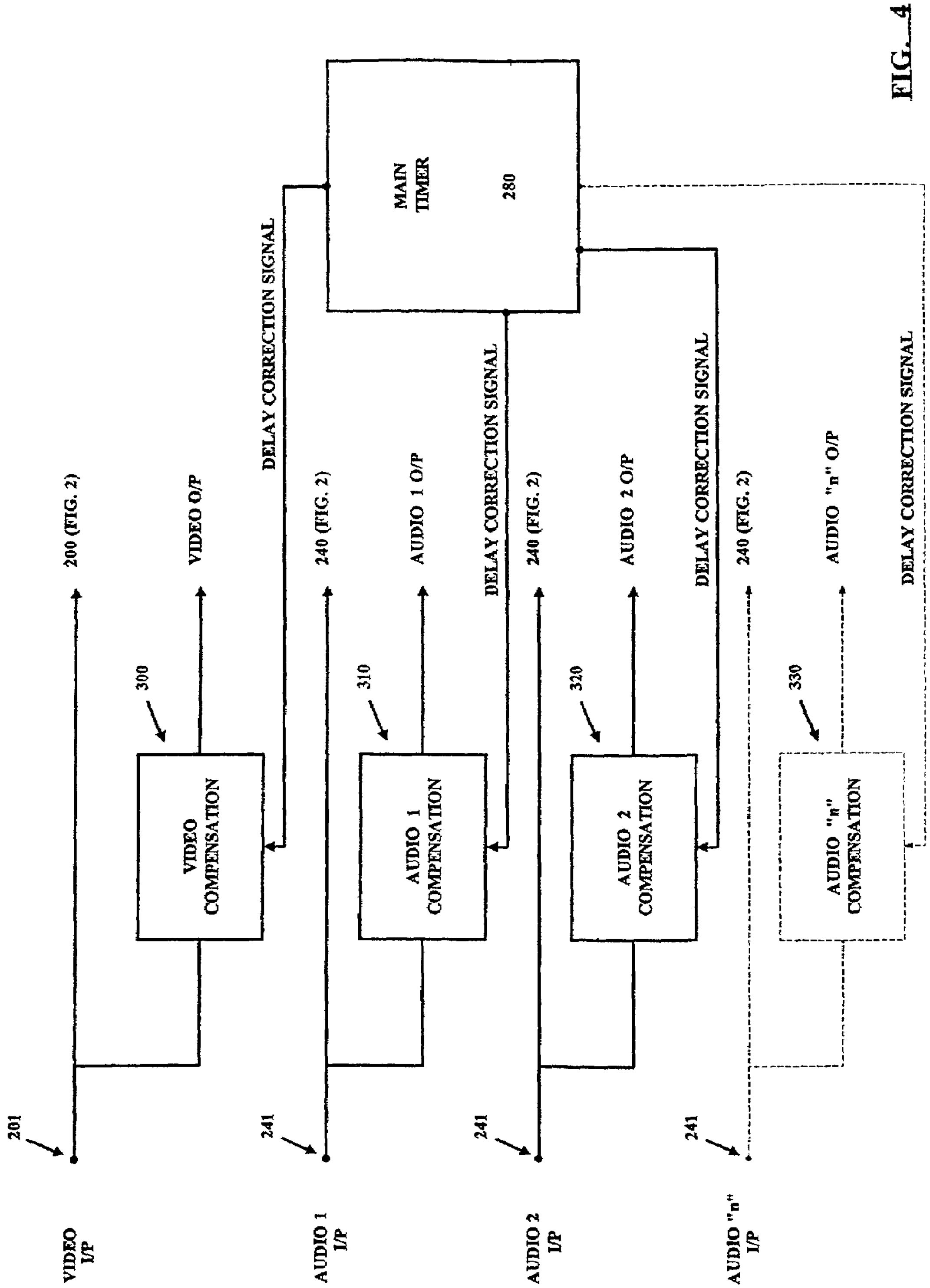
FIG. 4 is a block schematic diagram showing one example of how an embodiment of the invention may be used to provide automatic video/audio delay compensation.

FIG. 4 illustrates a system for automatic delay compensation, in which a delay correction signal is output from the main timer 280 and input to a video compensation circuit 300 which is connected in parallel with the video input 200 to an upstream video input 201. The video compensation circuit introduces, when required, a delay into the received video signal, to output for viewing or further processing a video output signal that is then in synchronism with the or each corresponding audio signal. The amount of delay that is so introduced is determined by the video delay correction signal received from the main timer 280.

In an analogous manner, audio signal 1 may be delayed, when required, by a first audio compensation circuit 310 which is connected in parallel with the audio 1 input 240 to an upstream audio input 241, and which receives a corresponding audio delay correction signal from the main timer 280, to output for listening or further processing an audio output signal that is then in synchronism with the video signal and each other corresponding audio signal, if any. The amount of delay that is so introduced is determined by the audio 1 delay correction signal received from the main timer 280.

Similarly, second and further audio compensation circuits 320, 330 are each connected in parallel with their respective audio input 240 to an upstream audio input 241, and each receives a corresponding audio delay correction signal from the main timer 280, to output for listening or further processing an audio output signal that is then in synchronism with the video signal and each other corresponding audio signal, if any. The amount of delay that is so introduced is determined by the respective audio delay correction signal received from the main timer 280.

Thus, depending upon which signals are measured by the main timer 280 to be delayed with respect to one another and by how much, appropriate delay is introduced by one or more of the video and audio compensation circuits, to compensate for such delay in the finally output signals.

In an alternative closed loop system, video and audio compensation circuits may be arranged to compensate for delays in received signals that are then processed by a measurement device (e.g. similar to the main timer 280) until that device detects no delay, or delay below an acceptable, predetermined level.

In the receiving apparatus 2, should the arrival of only one audio signal be detected by the main timer 280 then, after a predetermined time period, the circuitry may assume that, in the absence of the arrival of a further audio signal, there is only one signal to be received or, in the case of stereo capability, that the received audio signal is mono. Then, a suitable indication may be displayed and/or displays relating to delay between the video and absent audio signal 1 or 2 may be blanked.

As mentioned above, the illustrated system is particularly advantageous in that it can be used reliably even with modern digital compression techniques, because it does not rely on the use of synchronising pulses in the video signal, but rather ensures that all of the synchronising information between each pair of corresponding video and audio test signals is transmitted during active picture periods. For the system to work effectively, the audio signal burst must be greater than the field blanking interval and, in practice, this is very readily achieved. A 40 mS audio burst in the illustrated example is ample.

Instead of the audio burst being exactly coincident with the peak white video pulse in the transmitting apparatus 2, it may be displaced in time by a predetermined and known amount, which is then taken into account by the subsequent processing circuitry in the receiving apparatus 2. However, it is particularly simple and convenient if the audio burst and the video pulse are exactly time coincident in the transmitting apparatus 1.

Although, in the illustrated example, the video test signal comprises a burst of peak white in an otherwise black level signal, it is to be appreciated that variations of the illustrated system may be adapted to work with a video test signal that changes between any two contrasting states that can be detected at the receiving end. For example, at one extreme, the video test signal may comprise two different but predetermined and known contrasting pictures. Instead of the video pulses being of different voltage level from black to peak white, they may be signals of contrasting frequencies. Similarly, the audio test signal could comprise respective portions of differing and contrasting frequencies, different waveform shapes and so on.

However, for simplicity and economy, the example illustrated in FIGS. 1 and 2 is particularly effective. There are very few components in the receiving apparatus 2 that require setting to any great accuracy. The only part of particular accuracy is the reference clock 282 which generates the clock pulses for the main timer 280. The timing for the rest of the circuitry in the receiving apparatus 2 is derived from the video signal as received. No audio or video filtering or correlation is required to determine the arrival of signals and their relative timing. The relative delays are measured by a simple counter function.

To simplify the system of FIGS. 1 and 2 even further, the transmitting apparatus 2 may be substituted by a "flash and squeak" box which may be pointed at a camera and microphone at, for example, a remote outside broadcast location. The "flash and squeak" box may be a pocket-sized unit that may be readily carried about and could have a simple method of actuation, which causes a bright light to flash for a short period, coincident with an audio burst ("squeak"). Such a flash and squeak may be discriminated readily at the receiving end by the receiving apparatus 2. A series of flashes and squeaks may be desirable to ensure discrimination at the receiving end. Adjustment of the video and audio comparison signals fed to the comparators 220 and 250 will naturally adjust the sensitivity of the detection. The equivalent to the black level of the illustrated video test signal may be achieved with the "flash and squeak" box by ensuring a low luminance level in the signal captured by the camera prior to the actuation of the flash and squeak. Similarly, the silent period of the illustrated audio test signal could be approximated by a low audio level at the transmitting site.

Alternatively, the video and audio signal comprising flash and squeak could be injected directly into the camera and microphone lines. There already exists a portable, hand-held "line-up" box that is used in outside broadcasts to inject colour bars and tone into camera and microphone lines, in order to line up the broadcast system. Such a box could be adapted to give coincident 40 mS pulses of black level and audio silence at 7 second intervals, in order to provide video and audio test signals of contrasting first and second states which are then subsequently detected and processed at the receiving end to indicate and/or compensate for audio and/or video synchronisation errors, in a manner generally as described for the illustrated embodiments of the invention. Thus, the hand-held box could conveniently provide both line-up and synchronisation in one easy operation. Of course, the duration and repetition frequency of the 40 mS pulses may be varied as desired, as may the nature of the contrasting first and second states of the video and audio test signals.

The illustrated system is particularly convenient for use as a means of calibrating a transmission link, prior to the transmission of programme material. Once a particular transmission link has been calibrated, it is not often the case that synchronisation will subsequently slip during the average broadcast of programme material. As an alternative, however, the illustrated system may be adapted for use on a continuous basis, whereby the video pulse and audio burst (of suitable durations) are transmitted at suitable levels during the first few lines of active picture of each field, for example, at one minute intervals, such that they are imperceptible to a viewer. The audio signal may then be an anti-phase, dual-tone, low-level signal. In this way, audio and video synchronisation can be continuously measured, displayed and/or automatically maintained.

Where a stereo audio signal is transmitted and received, additional means may be provided for effecting phase compensation between the left and right channels of the signal.

These days, video and audio signals are transmitted over many different media, as has already been indicated. Although a frequency of 6 kHz may be suitable for many transmission links, a lower frequency (e.g. 2 kHz) may be more suitable for low quality audio links, such as simple telephone lines. A facility may be provided for adjusting the frequency of the audio burst as transmitted.

The video pulses can be any desired period apart. However, we have found that 7 second intervals work well. This period gives sufficient time for most delays that might practically be expected to be accommodated, and for the system to reset satisfactorily, to await the next set of timing signals.

Although the illustrated example of the invention is particularly advantageous for use with digital signals and processing equipment, it may be used equally well with analogue signals and processing equipment.

Although the illustrated example of the invention is for use with a transmission link, which would typically be between two remote places, embodiments of the invention may also find application in studio environments, where video and/or audio signals are subject to signal processing techniques that introduce a delay into the signal. A well-known example of this is in video effects generators, which typically introduce a finite delay into the video signal, whilst the corresponding audio signal will typically be unaffected by such a delay.

Embodiments of the invention may therefore be used to compensate for loss of synchronisation in the transmission of video and audio signals between two remote places. This may be, for example, between transmitting and receiving base stations. They may equally find use in domestic situations, to achieve synchronisation in signals received by a domestic receiver from a transmission or distribution point. They may also find use in studio or other environments where it is necessary to compensate for unequal delays in video and audio signals.

Embodiments of the invention may be used to compensate for loss of synchronisation where video and audio signals are transmitted both with and without multiplexing. For example, a plurality of channels may be transmitted concurrently using multiplexing techniques, and one, more or all of the channels may be compensated for loss of video and audio synchronisation, by means of embodiments of the invention. Embodiments of the invention may be used where signals are transmitted by means of a single carrier, or by means of a plurality of carriers. For example, the video signal of a sports event and the background audio may be transmitted by a common carrier or respective individual carriers, and commentaries may be transmitted in different languages by different respective individual carriers.

Embodiments of the invention may be used to compensate for loss of synchronisation where video and audio signals are transmitted over a data link. For example, a high speed data link may transmit both video and audio signals over any communications system, including LAN and WAN communications infrastructures. Such a data link may concurrently transmit data, which is either associated with the respective video and/or audio signals, or independent thereof.

A further example of such a data link is videoconferencing over the Internet. In such an example, repeated synchronisation on a continuous basis may be required at relatively short intervals, since the characteristics of the communications network will be continually changing.

Embodiments of the invention have been found to re-establish accuracy of synchronisation between video and audio signals, to an accuracy of +/−1.6 mS.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for synchronising video and audio signals transmitted over a link between a first point and a second point, the system comprising:

a. for use at said first point:
   - i. video generating means for generating a video test signal having a first active picture period of a first state and a second active picture period of a second state which contrasts with said first state;
   - ii. audio generating means for generating an audio test signal having a first period of a first state and a second period of a second state which contrasts with said first state, said second periods of said audio and video test signals having a predetermined time relationship such that each said second period of said audio test signal is associated with a respective said second period of said video test signal, to make a respective pair of associated video and audio signals;
   - iii. video output means for outputting over said link a video output signal comprising said video test signal; and
   - iv. audio output means for outputting over said link an audio output signal comprising said audio test signal: and b. for use at said second point:
   - i. video input means for receiving said video output signal output over said link by said video output means;
   - ii. audio input means for receiving said audio output signal output over said link by said audio output means;
   - iii. a video timing signal generator arranged to receive from said video input means said received video output signal and generate therefrom gating signals which represent active picture periods in said received video output signal;
   - iv. video detection means for receiving said received video output signal, detecting when said video test signal in said received video output signal changes to said second state, and outputting a video timing signal when said video test signal in said received video output signal changes to said second state;
   - v. audio detection means for receiving said received audio output signal, detecting when said audio test signal in said received audio output signal changes to said second state, and outputting an audio timing signal when said audio test signal in said received audio output signal changes to said second state, such that each said audio timing signal is associated with the video timing signal of its respective pair;
   - vi. gating means arranged to receive said gating signals and said video and audio timing signals and to pass said video and audio timing signals only during active picture periods in said received video output signal, as indicated by said gating signals; and
   - vii. timing measurement means for receiving said video and audio timing signals passed by said gating means, detecting whether there has been any change in said predetermined time relationship between each pair of said video and audio timing signals, detecting whether said video timing signal or said audio timing signal of each associated pair has been delayed with respect to the other, measuring any such delay, providing a measurement signal representative of any such delay, and providing an indication signal representative of whether an audio timing signal has been delayed with respect to the video timing signal of its respective pair or vice-versa.

2. A system according to claim 1, wherein, for each pair of said audio and video test signals, said second periods are coincident in time.

3. A system according to claim 1, wherein, for each pair of said audio and video test signals, said second periods are a predetermined time apart.

4. A method of synchronising video and audio signals transmitted over a link between a first point and a second point, the method comprising the steps of:

a. at said first point:
   i. generating a video test signal having a first active picture period of a first state and a second active picture period of a second state which contrasts with said first state;
   ii. generating an audio test signal having a first period of a first state and a second period of a second state which contrasts with said first state, said second periods of said audio and video test signals having a predetermined time relationship such that each said second period of said audio test signal is associated with a respective said second period of said video test signal, to make a respective pair of associated video and audio signals;
   iii. outputting over said link a video output signal comprising said video test signal; and
   iv. outputting over said link an audio output signal comprising said audio test signal: and
b. at said second point:
   i. receiving said video output signal output over said link by said video output means;
   ii. receiving said audio output signal output over said link by said audio output means;
   iii. generating from said received video output signal and gating signals which represent active picture periods in said received video output signal;
   iv. detecting when said video test signal in said received video output signal changes to said second state, and outputting a video timing signal when said video test signal in said received video output signal changes to said second state;
   v. detecting when said audio test signal in said received audio output signal changes to said second state, and outputting an audio timing signal when said audio test signal in said received audio output signal changes to said second state, such that each said audio timing signal is associated with the video timing signal of its respective pair;
   vi. receiving said gating signals and gating said video and audio timing signals to pass said video and audio timing signals only during active picture periods in said received video output signal, as indicated by said gating signals; and
   vii. detecting in said video and audio timing signals passed by said gating means, whether there has been any change in said predetermined time relationship between each pair of said video and audio timing signals, detecting whether said video timing signal or said audio timing signal of each associated pair has been delayed with respect to the other, measuring any such delay, providing a measurement signal representative of any such delay, and providing an indication signal representative of whether an audio timing signal has been delayed with respect to the video timing signal of its respective pair or vice-versa.

5. A system according to claim 1, wherein said first point is at a transmitter, said second point is at a receiver, and said link is a transmission link between said transmitter and receiver.

6. A system according to claim 5, wherein said transmission link includes a satellite transmission path.

7. A system according to claim 6, wherein said transmission link includes said satellite path for video signals and a terrestrial path for corresponding audio signals.

8. A system according to claim 1, wherein said first point is at a transmitter or transmission distribution point, and said second point is at a domestic receiver.

9. A system according to claim 1, wherein said first point is upstream of a video processing apparatus and said second point is downstream of said video processing apparatus.

10. A system according to claim 9, wherein said video processing apparatus comprises a video effects generator.

11. A system according to claim 1, wherein said first and second states of said video test signal are represented by contrasting voltage levels.

12. A system according to claim 1, wherein said first and second states of said audio test signal are represented by contrasting voltage levels.

13. A system according to claim 1, wherein said video and audio output signals are transmitted over said link in digital form.

14. A system according to claim 1, wherein one or both of said video and audio signals is or are transmitted as part of a multiplexed signal.

15. A system according to claim 1, wherein transmission of said signals over said link is by way of a plurality of different carrier signals.

16. A system according to claim 1, wherein said link comprises a data link for the transmission of video, audio and data signals.

* * * * *